US008000227B2

(12) United States Patent
Sun et al.

(10) Patent No.: US 8,000,227 B2
(45) Date of Patent: Aug. 16, 2011

(54) DECISION FEEDBACK CHANNEL ESTIMATION AND PILOT TRACKING FOR OFDM SYSTEMS

(75) Inventors: Qinfang Sun, Cupertino, CA (US); Won-Joon Choi, Cupertino, CA (US); Jeffrey M. Gilbert, Sunnyvale, CA (US); Ning Zhang, Saratoga, CA (US); Yi-Hsiu Wang, Palo Alto, CA (US); Tao-Fei Samuel Ng, Fremont, CA (US)

(73) Assignee: Atheros Communications, Inc., San Jose, CA (US)

( * ) Notice: Subject to any disclaimer, the term of this patent is extended or adjusted under 35 U.S.C. 154(b) by 0 days.

(21) Appl. No.: 12/688,733

(22) Filed: Jan. 15, 2010

(65) Prior Publication Data
US 2010/0111212 A1    May 6, 2010

Related U.S. Application Data

(63) Continuation of application No. 11/150,619, filed on Jun. 10, 2005, now Pat. No. 7,693,036, and a continuation of application No. 10/263,415, filed on Oct. 1, 2002, now Pat. No. 7,039,004.

(51) Int. Cl.
H04J 11/00    (2006.01)

(52) U.S. Cl. ........................................ 370/208; 375/260

(58) Field of Classification Search ................ 370/208, 370/210, 235, 236, 236.1, 236.2, 470, 472, 370/473, 474; 375/260
See application file for complete search history.

(56) References Cited

U.S. PATENT DOCUMENTS

| | | | |
|---|---|---|---|
| 5,285,482 A | 2/1994 | Sehier et al. | |
| 5,406,551 A | 4/1995 | Saito et al. | |
| 5,428,647 A | 6/1995 | Rasky et al. | |
| 5,771,224 A | 6/1998 | Seki et al. | |
| 5,790,604 A | 8/1998 | Kelton et al. | |
| 5,838,728 A | 11/1998 | Alamouti et al. | |
| 5,923,666 A * | 7/1999 | Gledhill et al. | 370/480 |
| 6,029,057 A * | 2/2000 | Paatelma et al. | 455/277.2 |
| 6,477,210 B2 | 11/2002 | Chuang et al. | |
| 6,516,027 B1 | 2/2003 | Kapoor et al. | |
| 6,603,811 B1 | 8/2003 | Dobson et al. | |
| 6,608,863 B1 | 8/2003 | Onizawa et al. | |
| 6,611,551 B1 | 8/2003 | Jones, IV et al. | |
| 6,633,616 B2 | 10/2003 | Crawford | |
| 6,650,617 B1 | 11/2003 | Belotserkovsky et al. | |
| 6,658,063 B1 | 12/2003 | Mizoguchi et al. | |

(Continued)

FOREIGN PATENT DOCUMENTS

WO    WO 99/14872 A1    3/1999

*Primary Examiner* — Derrick W Ferris
*Assistant Examiner* — Peter Cheng
(74) *Attorney, Agent, or Firm* — Bever, Hoffman & Harms, LLP; Jeanette S. Harms (57) ABSTRACT

Current OFDM systems use a limited number of symbols and/or sub-channels to provide approximations for channel estimations and pilot tracking, i.e. phase estimations. For example, two training symbols in the preamble of a data packet are used to provide channel estimation. Four of the fifty-four sub-channels are reserved for providing phase estimation. However, noise and other imperfections can cause errors in both of these estimations, thereby degrading system performance.

Advantageously, decision feedback mechanisms can be provided to significantly improve channel estimation and pilot tracking in OFDM systems. The decision feedback mechanisms can use data symbols in the data packet to improve channel estimation as well as data sub-channels to improve pilot tracking.

2 Claims, 9 Drawing Sheets

U.S. PATENT DOCUMENTS

| | | |
|---|---|---|
| 6,700,919 B1 | 3/2004 | Papasakellariou |
| 6,850,481 B2 | 2/2005 | Wu et al. |
| 6,882,691 B2 | 4/2005 | Chiodini |
| 6,990,059 B1 | 1/2006 | Anikhindi et al. |
| 6,993,083 B1 * | 1/2006 | Shirakata et al. ............. 375/260 |
| 7,072,413 B2 * | 7/2006 | Walton et al. ................ 375/267 |
| 7,379,513 B2 | 5/2008 | Wang et al. |
| 2002/0065047 A1 * | 5/2002 | Moose ............................ 455/63 |
| 2003/0021332 A1 * | 1/2003 | Li ................................. 375/147 |
| 2003/0058787 A1 | 3/2003 | Vandenameele-Lepla |
| 2003/0081562 A1 | 5/2003 | Iwamatsu et al. |
| 2006/0093053 A1 * | 5/2006 | Jones et al. ................... 375/260 |

* cited by examiner

DECISION FEEDBACK CHANNEL ESTIMATION AND PILOT TRACKING FOR OFDM SYSTEMS

RELATED APPLICATIONS

This application is a continuation of U.S. patent application Ser. No. 11/150,619, entitled "Decision Feedback Channel Estimation And Pilot Tracking For OFDM Systems" filed Jun. 10, 2005 which is a continuation of U.S. patent application Ser. No. 10/263,415, entitled "Decision Feedback Channel Estimation And Pilot Tracking For OFDM Systems" filed Oct. 1, 2002.

BACKGROUND OF THE INVENTION

1. Field of the Invention

The present invention relates to an Orthogonal Frequency Division Multiplexing (OFDM) system, and in particular to improvements in channel estimation and pilot tracking in this OFDM system.

2. Description of the Related Art

Wireless systems frequently operate under challenging conditions. These conditions include the complexity of the environment in which a communication channel is desired and the mobility of one or more users using the channel in such an environment. For example, objects in the environment can reflect a transmitted wireless signal. This phenomenon is called a multipath condition. To address multipath and other conditions, a wireless system can employ various techniques. One such technique is Orthogonal Frequency Division Multiplexing (OFDM).

In an OFDM system, a signal can be split into multiple narrowband channels (called sub-channels) at different frequencies. For example, current 802.11a OFDM systems include 52 sub-channels. Thus, a transmitted signal could be represented by $x_{-26} \ldots x_{-1}, x_1 \ldots x_{26}$, wherein both negative and positive side frequencies are included. In this configuration, each sub-channel carries a portion of the signal. Each sub-channel is "orthogonal" (i.e. independent) from every other sub-channel. Multipath conditions and noise can result in deterioration of this orthogonality.

Figure 1:
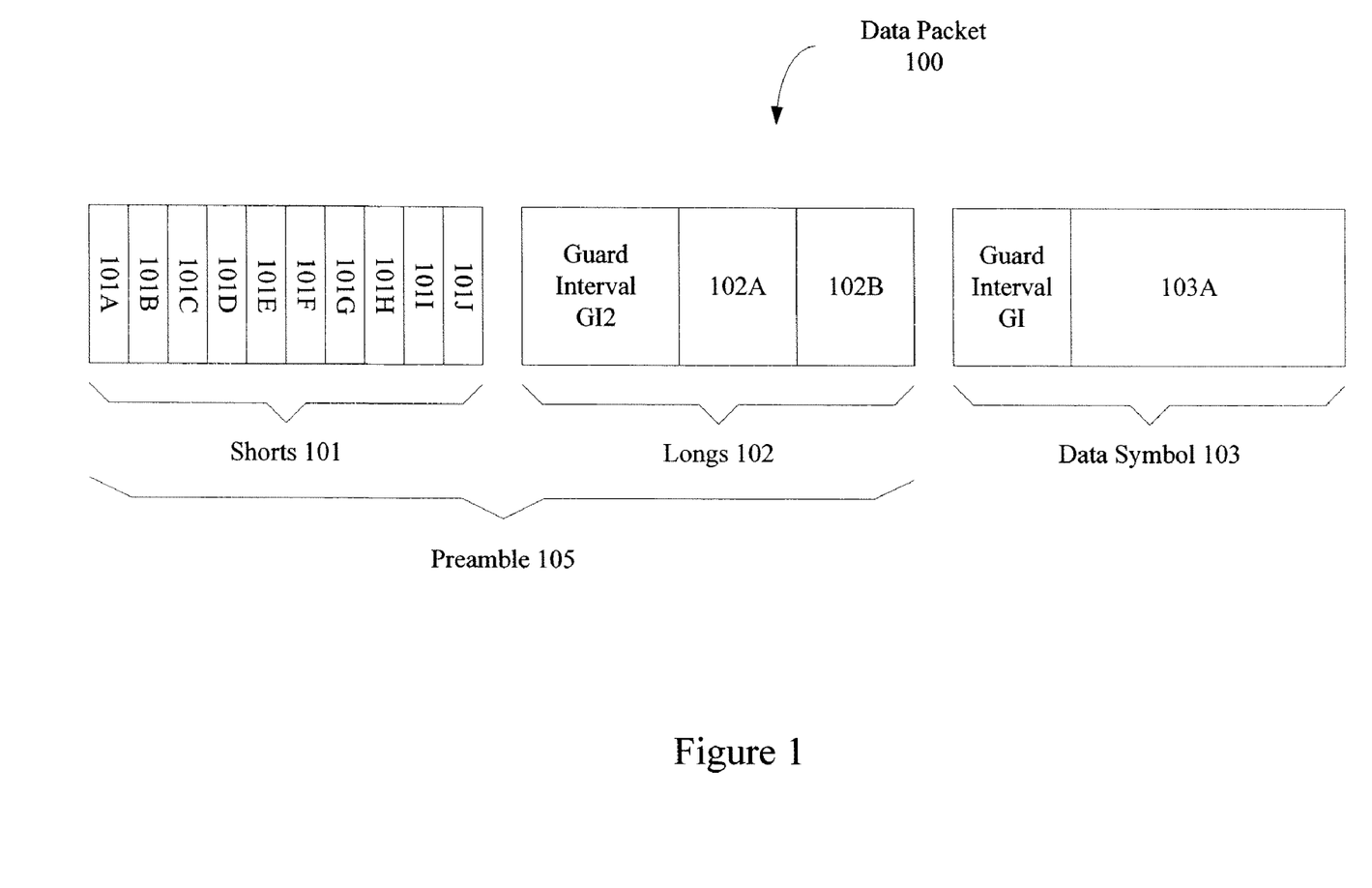
FIG. 1 illustrates a portion of a data packet including a preamble and a data symbol.

In an attempt to restore orthogonality, the 1999 IEEE 802.11a standard provides that a transmitted data packet includes a preamble, which precedes the actual data. FIG. 1 illustrates a portion of a data packet 100 including a preamble 105. As defined in the 802.11a standard, preamble 105 includes 10 "short" identical known symbols 101A-101J of length 16 (hereinafter shorts 101) concatenated to 2 "long" identical known symbols 102A-102B of length 64 (hereinafter longs 102). Note that a symbol refers to any waveform in time (e.g. represented as voltage versus time).

Longs 102 can be used to provide channel estimation. Specifically, because longs 102 are known, the receiver can use these symbols to provide rough channel estimations for a subsequent data symbol 103 in the data packet. In this manner, longs 102 can thereby increase the likelihood that the received data symbols can be correctly interpreted. Longs 102 are also called "training" symbols because they can "train" a frequency domain equalizer to learn about channel conditions.

Shorts 101 can be used to determine any frequency offset between the oscillators in the receiver and transmitter. Additionally, shorts 101 can be used to provide an initial system time synchronization. System time synchronization can also be continuously tuned using the data symbols, as now described in further detail.

Figure 2:
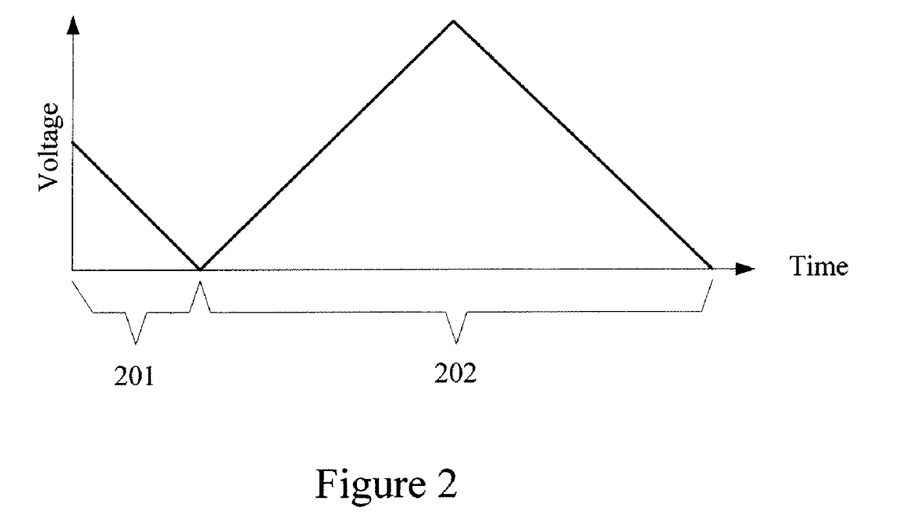
FIG. 2 illustrates a simplified data pattern with a guard interval attached to the beginning of the data.

The 802.11a standard provides that guard intervals (called GIs or mechanism cyclic prefixes) should be placed before longs and data. Specifically, a double guard interval (GI2) is placed before long symbols 102A-102B, thereby forming part of longs 102. In contrast, a regular guard interval (GI) is placed before data 103A, thereby forming part of data symbol 103. The double guard interval, as the name implies, is twice as long as the regular guard interval. In accordance with the 802.11a standard, the guard intervals are derived from their associated symbols. For example, FIG. 2 illustrates simplified data 202, which could be generated by 64 samples over time. A guard interval 201 essentially copies a last portion of data 202 and attaches it to the beginning of data 202. For example, in the 802.11a standard, the last ¼ of the symbol is copied. A last portion of longs 102 can also be copied to form double guard interval GI2 (e.g. in the 802.11a standard, essentially the last half of long symbol 102B).

A difference between the frequency of the transmitter and receiver oscillators can adversely and significantly impact system performance. For example, if the receiver's clock is not aligned with the incoming data, then sampling of the received signal could be sub-optimal. For this reason, "pilots", also known signals (e.g. −1 and 1) defined by the 802.11a standard, are provided on 4 of the 52 orthogonal sub-channels to track and correct the difference between clocks.

Figure 3:
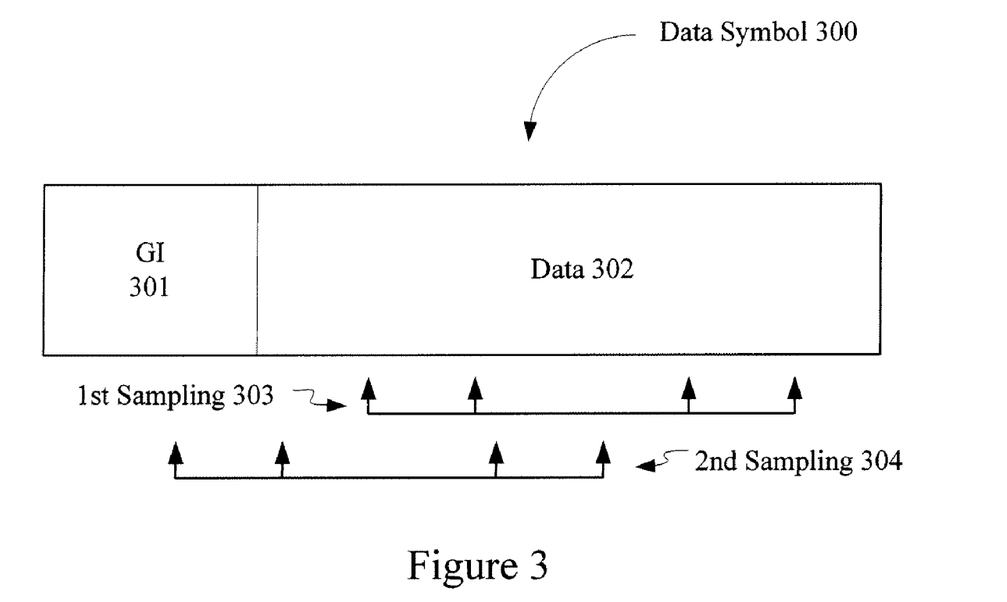
FIG. 3 illustrates the effect of non-synchronized clocks for a transmitter and a receiver on the sampling of an exemplary data symbol.
Figure 4:
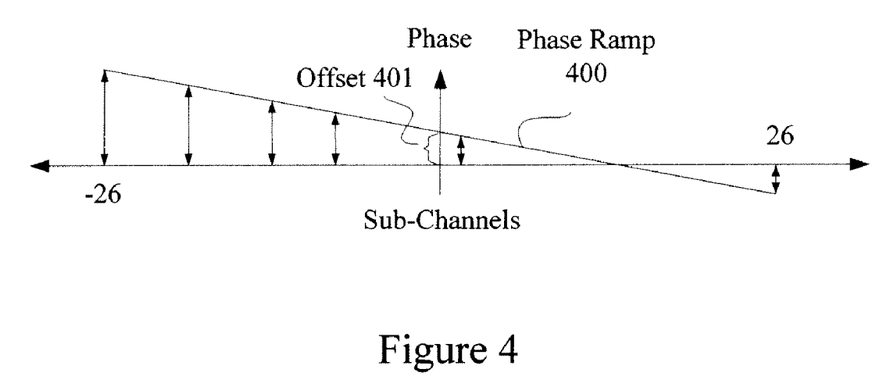
FIG. 4 illustrates a phase ramp and phase offset in the frequency domain caused by the de-synchronization shown in FIG. 3. The phase ramp is negative when the sampling time is earlier than the incoming data and positive when the sampling time is later than the incoming data.

For example, FIG. 3 illustrates a data symbol 300 including a GI 301 and data 302. If the receiver's clock samples earlier in time than the incoming data, then instead of detecting the values indicated by $1^{st}$ sampling 303, the values indicated by $2^{nd}$ sampling 304 could be detected. This de-synchronization can result in a phase ramp 400 in the frequency domain, as shown in FIG. 4. Note that phase ramp 400 is negative when the receiver's clock samples earlier in time than the incoming data and positive when the receiver's clock samples later in time than the incoming data. Because of the continual "slide" in sampling (see FIG. 3), the slope of the phase can continue to rotate symbol by symbol.

Moreover, when a signal is transmitted, the signal is modulated by the channel frequency, thereby improving its propagation properties in the channel. The modulation is based on the clock at the transmitter. Thus, at the receiver, the signal must be demodulated. This demodulation can result in some residual phase, which can be represented by an offset 401. The 4 pilots provided by the 802.11 standard attempt to track the phase slope and phase offset, thereby allowing the system to compensate for such slope and offset when necessary.

Unfortunately, sending just the two long symbols can be insufficient for accurate channel estimation, particularly when noise is present. Moreover, using four sub-channels can also be insufficient to compensate for phase slope and offset. Therefore, a need arises for a system and method for improving channel estimation and pilot tracking.

SUMMARY OF THE INVENTION

Current OFDM systems use a limited number of symbols and/or sub-channels to provide approximations for channel estimations and pilot tracking, i.e. phase estimations. However, noise and other imperfections can cause errors in both of these estimations, thereby degrading system performance. Advantageously, decision feedback mechanisms can be provided to significantly improve channel estimation and pilot tracking in OFDM systems. The decision feedback mechanisms can use data symbols in the data packet to improve channel estimation as well as data sub-channels to improve pilot tracking.

In accordance with one feature of the invention, a method of refining channel estimations in an OFDM system includes analyzing two training symbols provided in a preamble of a data packet and analyzing multiple data symbols of the data packet. In one embodiment, the number of multiple data symbols can be limited to reduce power consumption. The analyzing of multiple data symbols can include storing a received data symbol. The received data symbol can also be decoded using, for example a Viterbi decoder.

At this point, a transmitted signal corresponding to the received data symbol can be reconstructed from the decoded symbol. The stored received data symbol can then be divided by the reconstructed transmitted signal. Channel estimations can be refined based on the results of that division.

Specifically, in accordance with one feature of the invention, a channel estimation unit (CEU) can generate an initial channel estimate based on analyzing of the two training symbols. The CEU can refine that initial channel estimate based on a subsequent data symbol. Recursive refinements of the channel estimate can be made using subsequent data symbols. In one embodiment, a weighting factor can be provided for each analyzed data symbol.

To ensure the step of dividing is accurately performed, certain latencies can be considered. For example, the first data symbol in each packet includes a SIGNAL symbol, which includes the rate and packet length of the packet. Therefore, the step of dividing can include determining the latencies for decoding the data symbols following a SIGNAL symbol.

An OFDM receiver in accordance with the invention can include a channel estimator unit (CEU), a frequency domain equalizer (FEQ) for detecting a received signal from the transmitter using the receiving channel estimations from the CEU. A decision feedback mechanism in the OFDM receiver advantageously allows refinement of the channel estimations.

The decision feedback mechanism can include a decoder for decoding a received data symbol as well as an encoder for reconstructing a transmitted signal that corresponds to the received data symbol. The decision feedback mechanism can further include storage for storing the received data symbol and a dividing unit for dividing the stored received data symbol by the reconstructed transmitted signal. The dividing unit provides its result to the CEU for channel estimation refinement.

In one embodiment, the storage can include means for providing a latency corresponding to a decoding of each symbol performed by the decoder. In another embodiment, the CEU can include means for providing a weighting factor based on a number of results received from the dividing unit. In yet another embodiment, the CEU can include means for limiting channel estimation based on a number of results received from the dividing unit.

In accordance with another feature of the invention, a method of improving pilot tracking in an OFDM system is provided. The method can include using a first subset of sub-channels in the OFDM system to provide a first accuracy of pilot tracking and using a second subset of sub-channels in the OFDM system to provide a second accuracy of pilot tracking. Of importance, the first subset of sub-channels includes only pilot sub-channels whereas the second subset of sub-channels includes data sub-channels.

Using the second subset of sub-channels can include applying a phase estimation for a previous symbol to a current received symbol. A hard decision can be generated based on the step of applying. In one embodiment, generating the hard decision can include a mapping function. At this point, the current received symbol can be divided by the hard decision to generate a phase. This phase can be provided to a channel estimation unit (CEU) in the OFDM system.

Using the second subset of sub-channels can further include selecting data sub-channels based on signal-to-noise ratios. For example, the number of selected data sub-channels could be limited to N. The data sub-channels could then be divided into N groups. The data sub-channel having the maximum power gain in each of the N groups could be selected.

In accordance with another feature of the invention, an OFDM receiver can include a channel estimation unit (CEU), a frequency domain equalizer (FEQ) for receiving phase estimations from the CEU as well as a received symbol from the transmitter, and a decision feedback mechanism coupled to the FEQ and the CEU. The decision feedback mechanism advantageously allows refinement of the phase estimations. The decision feedback mechanism can include means for calculating a hard decision and means for dividing a current received symbol by the hard decision, thereby generating a new phase for input to the CEU.

The OFDM receiver can further include means for selecting sub-channels having at least a predetermined signal-to-noise ratio. In this configuration, the decision feedback mechanism uses only the selected sub-channels for refining the phase estimations.

DETAILED DESCRIPTION OF THE FIGURES

System Overview

Current OFDM systems use a limited number of symbols and/or sub-channels to provide approximations for channel estimations and pilot tracking, i.e. phase estimations. Unfortunately, noise and other imperfections in the OFDM systems can cause errors in these estimations, thereby degrading system performance. Advantageously, decision feedback mechanisms can be provided to significantly improve channel estimation and pilot tracking in OFDM systems. As described below, the decision feedback mechanisms can use data symbols in the data packet to improve channel estimation as well as data sub-channels to improve pilot tracking.

Decision Feedback Channel Estimation Computation

Figure 5:
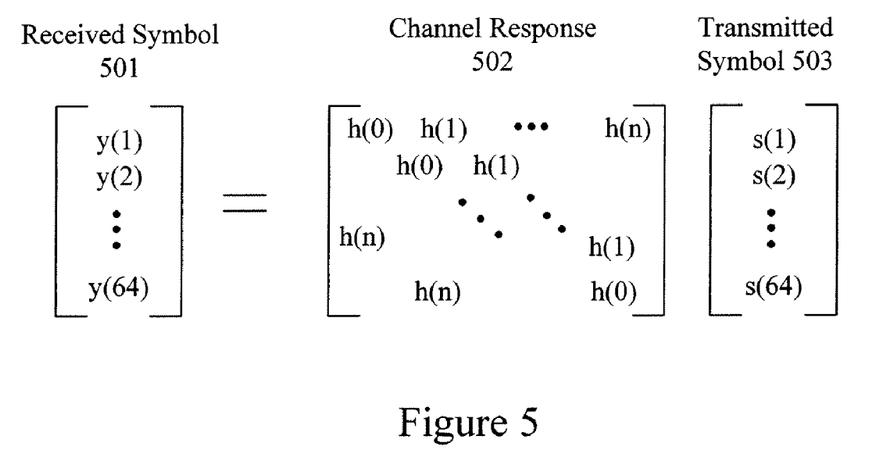
FIG. 5 illustrates the vector relationship between the transmitted symbol, the channel response, and the received symbol.

Channel estimation determines a response of a transmission medium, thereby facilitating the recovery of the transmitted symbol from its associated received symbol. A common model for channel response is a tap delay line, wherein the channel is represented by a series of taps, each tap having a certain delay. In this model, a symbol could be sampled at each tap, thereby determining its amplitude at that tap. Mathematically, this sampling can be represented as a convolution in a vector format, as shown in FIG. 5. Specifically, in FIG. 5, 64 samples are represented in vectors, i.e. received symbol 501 as well as transmitted symbol 503. Channel response 502, which is a convolution, transforms transmitted symbol 503 into received symbol 501.

Of importance, channel response 502 can be converted into a diagonal matrix by applying a Fast Fourier Transform (FFT) to received symbol 501 and transmitted symbol 503. In this manner, instead of multiple taps with different delays (i.e. a time domain function), orthogonal scalar channels (i.e. a frequency spectrum) can be analyzed. Various aspects of an OFDM system can then be computed.

For example, consider an OFDM system with N sub-channels. If $H_i$ is the complex gain of the i-th sub-channel, then $1 \leq i \leq N$. Assume the channel remains constant during the duration of the data transmission. Let $s_i$ be the data on the i-th sub-channel of the training symbol. If the same training symbol is transmitted twice, then the received signal is (k=1, 2):

$$y_{i,k} = H_i s_i + n_{i,k} \quad (1)$$

where $n_{i,k}$ is the additive white Gaussian noise in the i-th sub-channel for the k-th training symbol. The channel estimate based on the two training symbols can be obtained by:

$$\hat{H}_i = \frac{1}{2}\sum_{k=1}^{2}\frac{y_{i,k}}{s_i} = H_i + \frac{1}{2}\sum_{k=1}^{2}\frac{n_{i,k}}{s_i} = H_i + \Delta H_i \quad (2)$$

where $\Delta H_i$ is the channel estimation error due to noise.

If $x_{i,k}$ is the signal on the i-th sub-carrier for the k-th OFDM data symbol, then the received signal is:

$$y_{i,k} = H_i x_{i,k} + n_{i,k} \quad (3)$$

and the signal can be detected as:

$$\hat{x}_{i,k} = \frac{y_{i,k}}{\hat{H}_i} = x_{i,k} - \frac{\Delta H_i}{\hat{H}_i}x_{i,k} + \frac{n_{i,k}}{\hat{H}_i} \quad (4)$$

from Equations (2) and (3). As indicated in Equation (4), data detection is subject to errors caused by channel estimation error and noise.

Error correction codes, such as convolutional codes, can be used to correct the data errors. For example, let $\tilde{x}_{i,k}$ be the signal reconstructed from the decoded data symbols that corresponds to $x_{i,k}$. If the signal is decoded correctly, then $\tilde{x}_{i,k} = x_{i,k}$, $k \cdot \tilde{x}_{i,k}$ can be used to obtain an additional estimate of the channel:

$$\hat{H}_{i,k} = \frac{y_{i,k}}{\tilde{x}_{i,k}} \quad (5)$$

which can be combined with the current channel estimate to reduce the noise variance:

$$\hat{H}_i = (1-p_{i,k})\hat{H}_i + p_{i,k}\hat{H}_{i,k} \quad (6)$$

where $0 \leq p_{i,k} \leq 1$ is a weighting factor for the new channel estimate. This can be implemented iteratively for all the data symbols, k=1, 2, ... As described in further detail below, the weighting factor $p_{i,k}$ can decrease with the symbol index k. For amplitude modulations, $p_{i,k}$ can decrease with $|\tilde{x}_{i,k}|$ for better noise reduction.

Note that the above channel estimation algorithm can cause error propagation in the case of a decoding error. However, a common performance measure for broadband wireless data systems is the packet error rate. If a decoding error occurs, then the packet is already in error. Therefore, error propagation does not increase the packet error rate and, logically, will not affect system performance.

Decision Feedback Pilot Tracking Computation

As described above, the clock rate at the receiver and at the transmitter may be slightly different due to the frequency offset between the local oscillator (i.e. the oscillator at the receiver) and the oscillator at the transmitter. Frequency offset can cause an OFDM system to lose its orthogonality. Therefore, the offset is usually estimated and compensated for in the baseband signal processing. Residual frequency offset exists if the estimation is not perfect.

The effective channel gain of the i-th sub-carrier for the k-th OFDM symbol can be represented as:

$$H_{i,k} = H_i \cdot e^{j(\beta_k f_i + \theta_k)} \quad (7)$$

where $H_i$ is the initial channel gain, $\beta_k$ and $\theta_k$ are the phase slope and offset of the k-th symbol, and $f_i$ is the sub-carrier frequency. With frequency offset estimation and compensation, $\theta_k$ only depends on the residual frequency offset while $\beta_k$ depends on the frequency offset.

In order to detect the signal in the presence of frequency offset, the slope $\beta_k$ and offset $\theta_k$ need to be estimated and tracked. This is realized by transmitting known signals, i.e. the pilots, on a few pre-selected sub-carriers of each OFDM symbol. Let $s_{i,k}$ be the pilot signal on the i-th sub-carrier of the k-th symbol, where $i \in I$, I being the set of the sub-carrier indices of the pilots. Let $\alpha_{i,k}$ be the phase of $y_{i,k}/s_{i,k}$. Then:

$$\alpha_{i,k} = \beta_k f_i + \theta_k \pmod{2\pi} \quad (8)$$

$\beta_k$ and $\theta_k$ can be found by solving a traditional Least Square (LS) problem:

$$\hat{\beta}_k = \frac{\sum_i f_i \alpha_{i,k} - \left(\sum_i f_i \sum_i \alpha_{i,k}\right)/\|I\|}{\sum_i f_i^2 - \left(\sum_i f_i\right)^2 /\|I\|} \quad (9)$$

$$\hat{\theta}_k = \left(\sum_i \alpha_{i,k} - \hat{\beta}_k \sum_i f_i\right)/\|I\| \quad (10)$$

where $\|\mathbb{I}\|$ is the number of pilots. If $\beta_k f_i + \theta_k$ exceeds the range of $(-\pi, \pi)$, then a differential method based on the difference between every two consecutive symbols can replace the direct method.

Of importance, pilot tracking is subject to phase estimation errors due to noise, especially if one or more of the pilots are located in a null of the channel frequency response. Having more pilots will improve the tracking capability, but the transmission efficiency will be reduced.

In accordance with one feature of the invention, a decision feedback pilot tracking mechanism can use selected data sub-channels to enhance pilot tracking performance. First, hard decisions are obtained using the current symbol and the phase estimate of the previous symbol:

$$\bar{x}_{i,k} = g\left(\frac{y_{i,k}}{H_i \cdot e^{j(\hat{\beta}_{k-1} f_i + \hat{\theta}_{k-1})}}\right) \quad (11)$$

where $g(\cdot)$ is a hard decision mapping function. Then, the phase of the data sub-carriers is calculated by taking the angle of $y_{i,k}/\bar{x}_{i,k}$. The results are used together with the phase of the pilots to compute $\beta_k$ and $\theta_k$. As a result, the effective number of pilots is increased and the performance of pilot tracking is improved.

Because the slope $\beta_k$ depends on the timing offset, $$\beta_k = 2\pi\delta \cdot kT \quad (12)$$

where $\delta$ is the ppm frequency offset of the timing clock, and T is the OFDM symbol period, an alternative method is to compute $\hat{\beta}_k$ based on the frequency offset estimation using Equation (12). The offset $\hat{\theta}_k$ can still be computed using Equation (10). Note that for this computation the symbol timing clock is locked to the carrier frequency at both the transmitter and the receiver, which is mandatory in the 802.11a standard.

Exemplary Implementations for Decision Feedback Mechanisms

Figure 6:
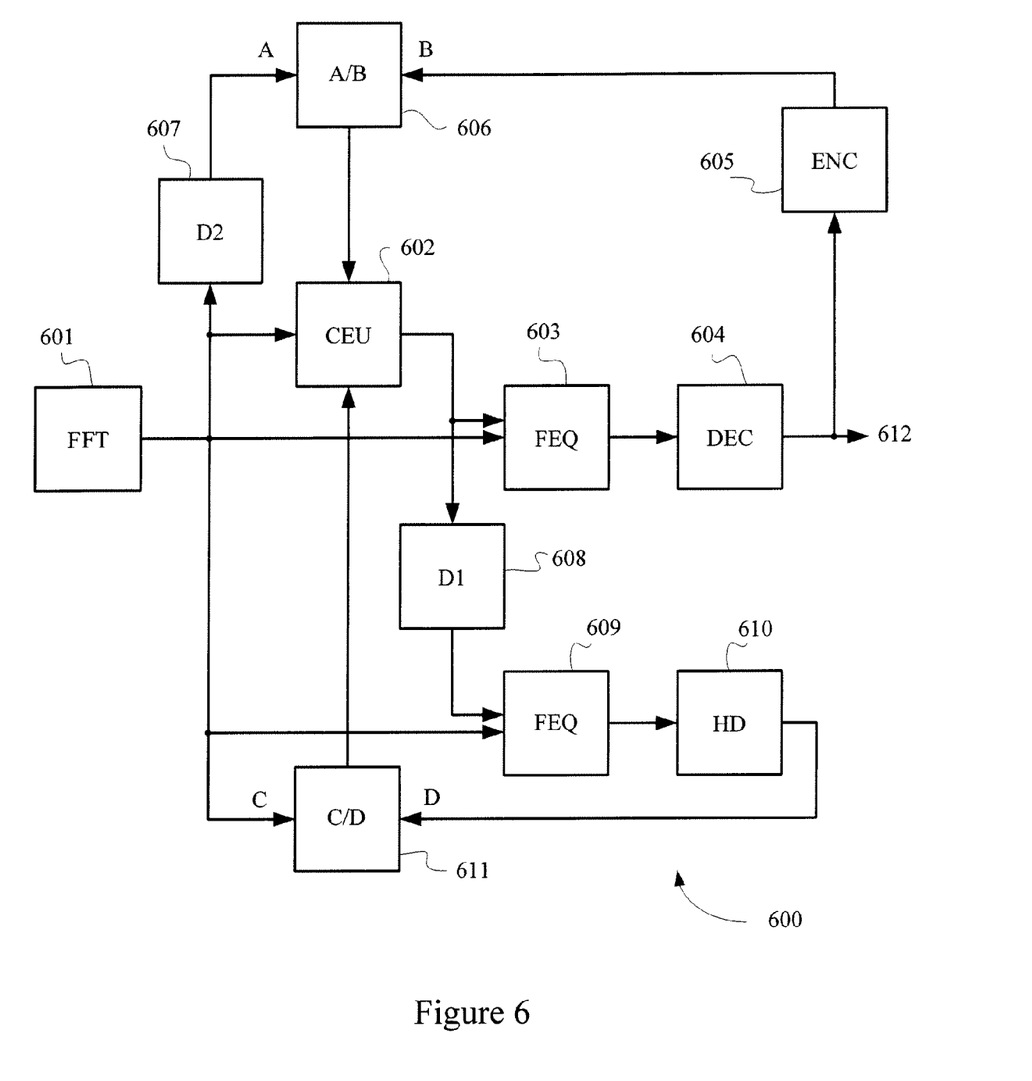
FIG. 6 illustrates a block diagram of an OFDM receiver including decision feedback mechanisms for channel estimation and pilot tracking.

FIG. 6 illustrates a block diagram of an OFDM receiver 600 including decision feedback mechanisms for channel estimation and pilot tracking. These mechanisms significantly enhance the performance of a standard data detection path, which includes a channel estimation unit (CEU) 602, a frequency domain equalizer (FEQ) 603, and a Viterbi decoder (DEC) 604. Note that the output of FFT 601 represents a received symbol (typically encoded) from a transmitter (not shown). After this received symbol is modified based on channel conditions and decoded, it can be provided to other components 612 for analysis/use.

Figure 7:
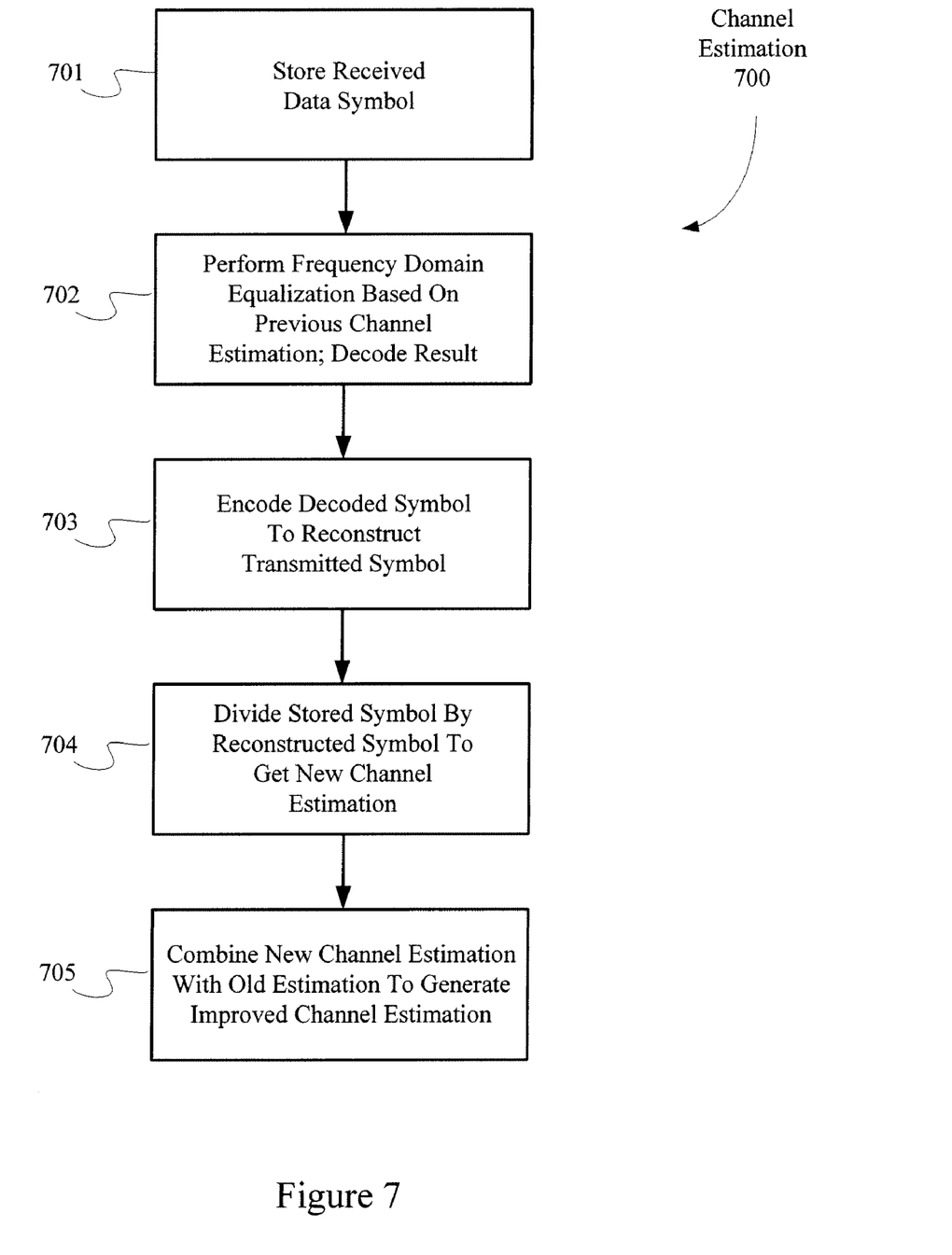
FIG. 7 illustrates a flow chart for providing decision feedback channel estimation.
Figure 8:
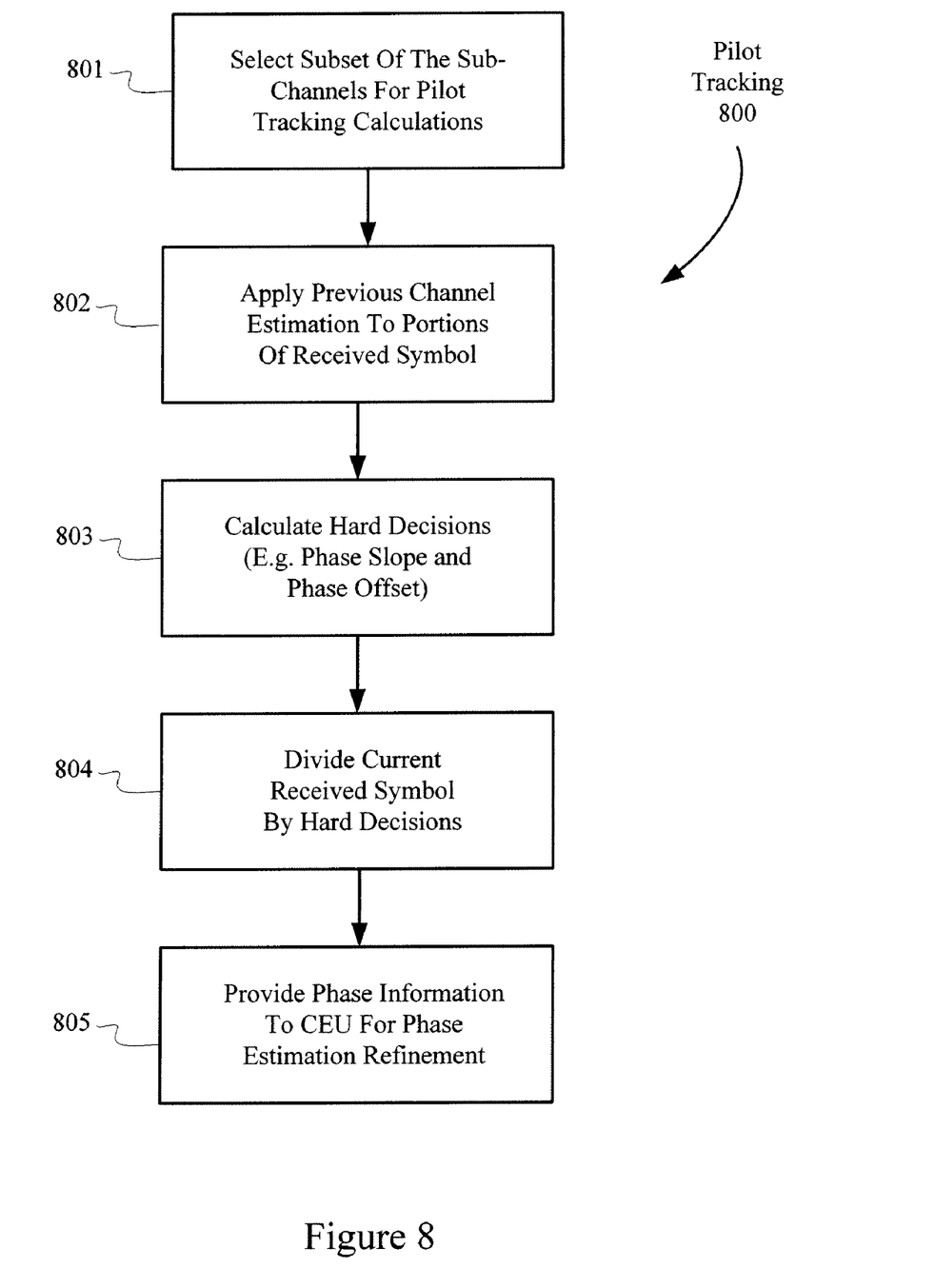
FIG. 8 illustrates a flow chart for providing decision feedback channel pilot tracking.

FIGS. 7 and 8 illustrate flow charts for providing decision feedback channel estimation and pilot tracking, respectively. Providing channel estimation 700 in accordance with the invention (FIG. 7) can include storing a received data symbol in step 701. In step 702, frequency domain equalization can be performed based on a previous channel estimation. Step 702 can further include decoding the result of frequency domain equalization.

The decoded symbol can be encoded in step 703 to reconstruct the transmitted symbol. In step 704, the stored (i.e. the received) symbol can be divided by the reconstructed symbol to generate a new channel estimation. In step 705, the new channel estimation can be combined with the old channel estimation(s) to generate an improved channel estimation.

Referring back to FIG. 6, to implement step 701, the value provided by FFT 601 (i.e. symbol $y_{i,k}$) could be stored in a storage unit 607. In one embodiment, the size of storage unit 607 could be based on the latency of Viterbi decoder 604. Specifically, the 802.11a standard implements convolutional codes with rates of ½, ⅔, and ¾.

The first data symbol in each data packet is a SIGNAL symbol, which indicates the rate and length of the data packet. The SIGNAL symbol needs to be decoded before the receiver can start detecting the rest of the packet. Therefore the latency of the Viterbi decoder for the SIGNAL symbol is one OFDM symbol. The latency of the normal data symbols can range from 3 to 12 symbols for a typical traceback length (i.e. longer for lower data rates). In general, if the latency is L, then the symbol $X_i$ is not available for decision feedback channel estimation until at symbol time i+L.

An FEQ 603 can be used to perform the frequency domain equalization of step 702 (i.e. compute the symbol $X_i$ using Equation 4). FEQ 603 can perform this equalization based on a previous channel estimation computed by CEU 602 (see Equations 5 and 6). Viterbi decoder 604 can decode the result of frequency domain equalization provided by FEQ 603. An encoder 605 can then reconstruct the transmitted symbol in step 703. A division unit 606 can be used to divide the reconstructed symbol by the stored (i.e. the received) symbol to generate a new channel estimation. CEU 602 can combine the new channel estimation with the old channel estimation(s) in step 705 to generate an improved channel estimation.

In one embodiment, the combination of channel estimations can be weighted to provide more accurate results. Specifically, in the 802.11a standard, two training symbols are transmitted in the preamble for initial channel estimation. Therefore, to get equal weighting for all the past symbols, the weighting factor in Equation (6) should be ⅓, ¼, ... for k=1, 2, ..., where k=1 corresponds to the SIGNAL symbol. On the other hand, the error in $\hat{H}_{i,k}$ decreases with $|\hat{x}_{i,k}|$, so the overall weighting factor can be computed as follows:

$$p_{i,k} = \frac{1}{k+2} \cdot \frac{|\hat{x}_{i,k}|}{\max|\hat{x}_{i,k}|} \quad (13)$$

Because the duration of typical data packets (i.e. in 802.11a implementations) is less than a few milliseconds, the channel can be considered as a time invariant during each packet. Therefore the combined channel estimate $\hat{H}_i$ in Equation (6) converges to the actual channel after some number of data symbols. In one embodiment, to reduce power consumption, CEU 602 can deactivate the decision feedback channel estimation after a certain number of data symbols. In another embodiment, CEU 602 can perform the decision feedback channel estimation once every several data symbols, thereby also reducing power consumption.

Note that in OFDM systems with frequency offset, the phase of the channel estimation from data symbols can rotate continuously. To deal with this issue, the phase of $\hat{H}_{i,k}$ is adjusted to a reference phase (i.e. an initial channel estimation) using the phase information obtained from pilot tracking (described in further detail below) before the combining in Equation (6).

Providing pilot tracking 800 in accordance with the invention (FIG. 8) can include selecting a subset of the sub-channels in step 801 for the pilot tracking calculations. Specifically, to ensure reliable phase computation for the decision feedback pilot tracking, only sub-channels with good signal-to-noise ratios are selected. In one embodiment, sub-channels that have a power gain exceeding ¼ of the maximum power gain or ½ of the mean power gain can be selected for pilot tracking.

To limit the hardware complexity, a hard limit can be set on the number of data sub-channels used for pilot tracking. For example, if the limit is X data sub-channels, then the data sub-channels can be divided into X groups, and the data sub-channel with the maximum power gain in each group can be selected. At this point, the power threshold can be applied to the selected sub-channels, e.g. any sub-channel below the threshold can be discarded. In another embodiment, a fixed set of data sub-channels can be pre-selected for decision feedback pilot tracking. In this embodiment, the power threshold can be applied to identify the sub-channels that exceed the designated power gain.

In step 802, phase information (i.e. slope and offset) of a previous data symbol can be applied to the current received data symbol. Specifically, frequency domain equalization can be performed on the current received data symbol. At this point, hard decisions (i.e. phase slope and phase offset) of the received signal can be computed in step 803. In step 804, the current received data symbol can be divided by the hard decisions, thereby generating new phase information for the selected sub-channels. This new phase information can be provided to a channel estimation unit in step 805 to improve pilot tracking.

Referring back to FIG. 6, to implement step 801, CEU 602 can select the appropriate subset of the sub-channels for pilot tracking calculations. Delay 608 can be used to ensure that an FEQ 609 applies the channel estimation for the previous data symbol to the selected sub-channels of the current received data symbol, i.e. the symbol provided by FFT 601, in step 802. A hard decision device 610 implements Equations 9-12 in step 803 to output the phase slope and phase offset. A dividing device 611 can be used in step 804 to divide the current received data symbol by the hard decisions. The output of dividing device 611, i.e. the new phase information, can be provided to CEU 602 in step 805 to further refine pilot tracing in OFDM receiver 600.

Results Using Decision Feedback Mechanisms

Figure 9:
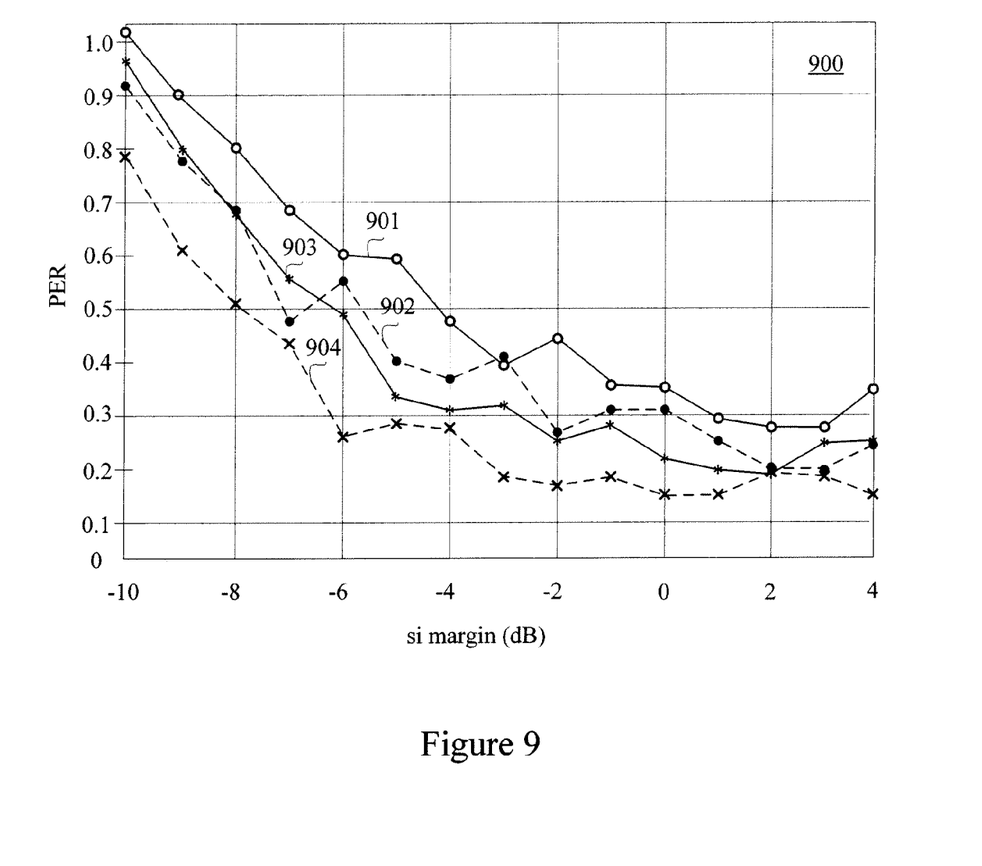
FIG. 9 illustrates a graph representing simulated results from using no decision feedback mechanisms, decision feedback channel estimation, decision feedback pilot tracking, and combined decision feedback channel estimation and pilot tracking at a data rate of 54 Mbps.

FIG. 9 illustrates a graph 900 representing results from using no decision feedback mechanisms (data points 901), decision feedback channel estimation (data points 902), decision feedback pilot tracking (data points 903), and combined decision feedback channel estimation and pilot tracking (data points 904). To generate graph 900, simulations were performed assuming a data rate of 54 Mbps with a delay spread of 100 ns. The signal-to-noise ratio (SNR) is approximately 31.7 plus the si margin (dB). The channel was assumed to be constant during the transmission of each packet, but could be different for different packets. The length of the packets was assumed to be 1000 bytes.

FIG. 9 indicates that both decision feedback channel estimation and decision feedback pilot tracking improve system performance. In other words, the packet error rate (PER) for either decision feedback mechanism is less than the PER without decision feedback. Advantageously, a total gain of approximately 7 dB can be achieved at 30% PER by combining decision feedback channel estimation and pilot tracking.

Figure 10:
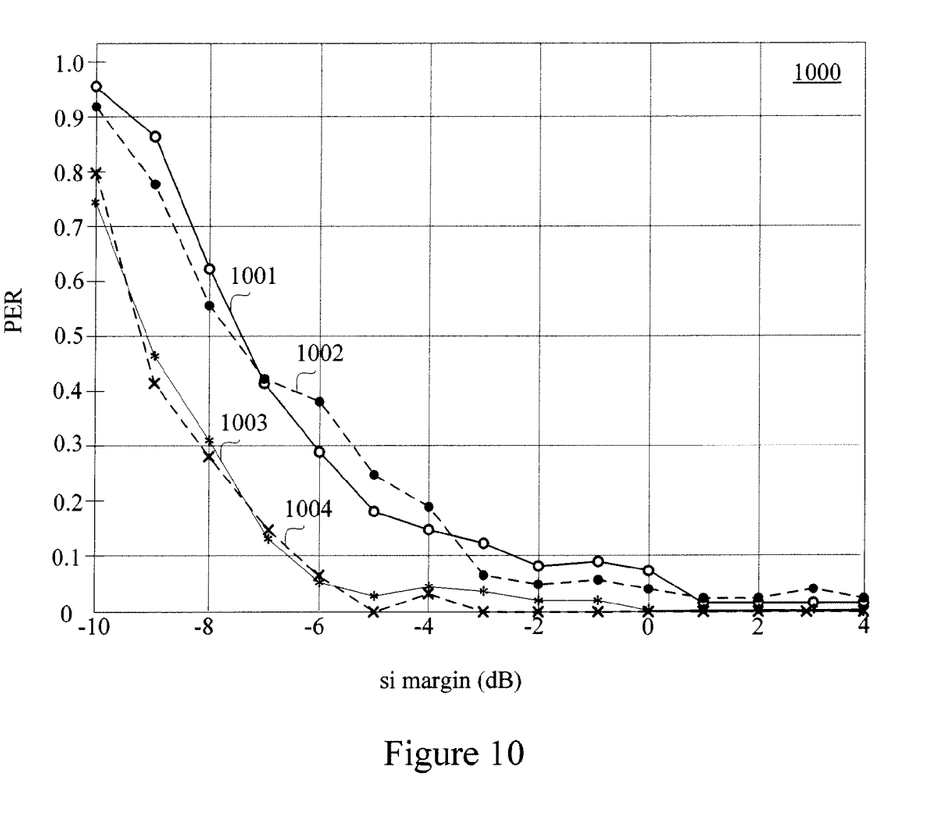
FIG. 10 illustrates a graph representing simulated results from using no decision feedback mechanisms, decision feedback channel estimation, decision feedback pilot tracking, and combined decision feedback channel estimation and pilot tracking at a data rate of 6 Mbps.

FIG. 10 illustrates a graph 1000 representing results from using no decision feedback mechanisms (data points 1001), decision feedback channel estimation (data points 1002), decision feedback pilot tracking (data points 1003), and combined decision feedback channel estimation and pilot tracking (data points 1004). To generate graph 1000, simulations were performed assuming a data rate of 6 Mbps with a delay spread of 200 ns. The SNR in FIG. 10 is approximately 14.7 plus the si margin (dB). The channel and packet lengths assumptions are the same as for FIG. 9.

FIG. 10 indicates that less gain may be obtained from decision feedback channel estimation because a 6 Mbps system uses BPSK, which is less sensitive to channel estimation error. (54 Mbps uses 64 QAM.) However, decision feedback pilot tracking still yields significant gains with about 4 dB at PER of 10%.

Figure 11:
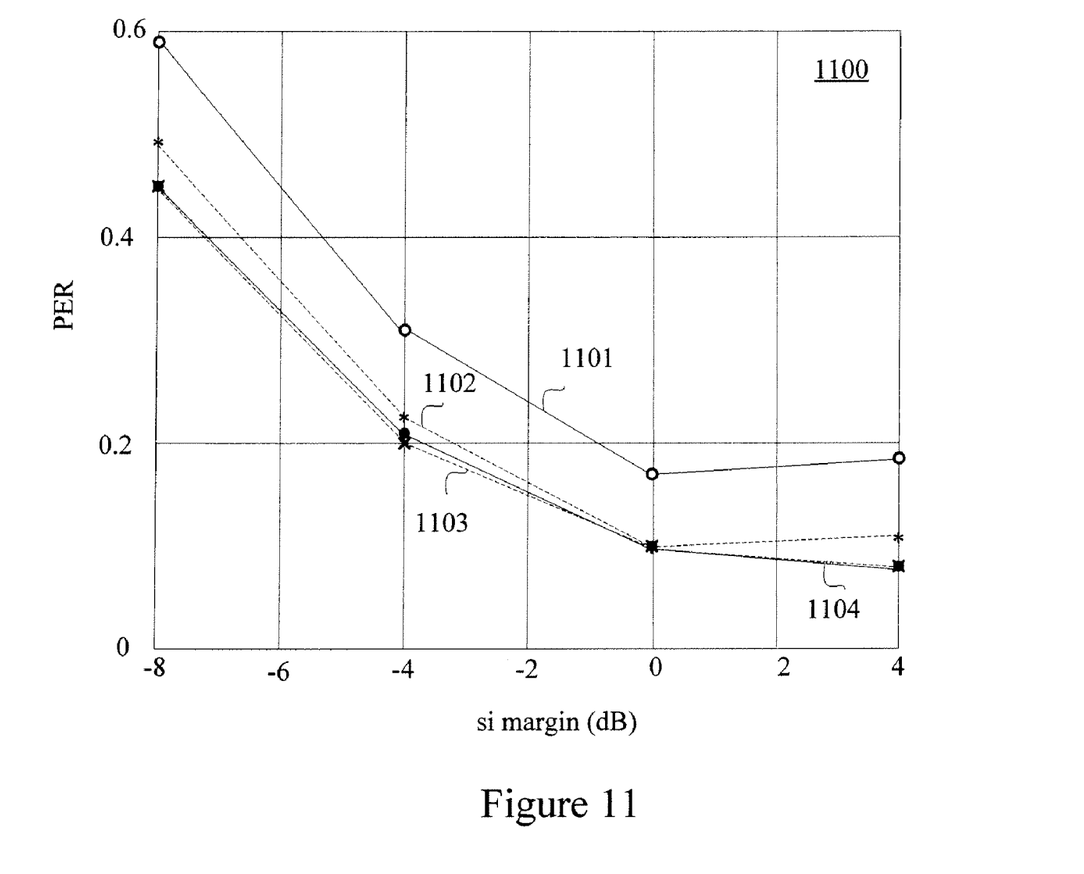
FIG. 11 illustrates a graph that shows the simulated impact of the number of data symbols used for decision feedback channel estimation on system performance.

FIG. 11 illustrates a graph 1100 that shows the simulated impact of the number of data symbols used for decision feedback channel estimation on system performance. The performance of four different channel estimation setups is compared. Specifically, graph 1100 compares no decision feedback (data points 1101), decision feedback using only the SIGNAL symbol (data points 1102), decision feedback using 5 data symbols (data points 1103), and decision feedback using all the data symbols (data points 1104). In this simulation, decision feedback pilot tracking is used in all cases. As shown by graph 1100, a significant portion of the gain of decision feedback channel estimation is achieved from the SIGNAL symbol. Additional performance improvement can be achieved by using a limited number of data symbols, e.g. 4-12 data symbols. Of importance, the performance achieved by using 5 data symbols or using all data symbols is substantially the same.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. Accordingly, it is intended that the scope of the invention be defined by the following Claims and their equivalents.

The invention claimed is:

1. An OFDM (Orthogonal Frequency Division Multiplexing) receiver comprising:
a channel estimator unit (CEU);
a frequency domain equalizer (FEQ) for receiving channel estimations from the CEU; and
a decision feedback device coupled to the FEQ and the CEU, the decision feedback device allowing refinement of the channel estimations based on analysis of data symbols on data sub-channels, wherein the decision feedback device includes:
a Viterbi decoder for decoding a first data symbol;
an encoder for reconstructing a transmitted data signal corresponding to the first data symbol;
a storage unit for storing a current received data symbol; and
a mathematical processing unit for using the stored received data symbol and the reconstructed transmitted data signal to generate a new channel estimation, the mathematical processing unit providing the new channel estimation to the CEU,
wherein the CEU combines the new channel estimation with one or more old channel estimations to generate an improved channel estimation, the CEU providing equal weighting for past symbols by decreasing a weighting factor associated with an increasing symbol index.

2. The OFDM receiver of claim 1, wherein the CEU can limit refinement of the channel estimations based on a number of received data symbols.

* * * * *